United States Patent
Ikari

(10) Patent No.: US 10,999,473 B2
(45) Date of Patent: May 4, 2021

(54) IMAGE PROCESSING APPARATUS, IMAGE PROCESSING METHOD, AND RECORDING MEDIUM TO CORRECT CHARACTERISTIC AMOUNT OF TARGET PIXEL USING BRIGHTNESS AT TWO PIXELS IN SET TARGET AREA

(71) Applicant: CANON KABUSHIKI KAISHA, Tokyo (JP)

(72) Inventor: Daiki Ikari, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/904,933

(22) Filed: Feb. 26, 2018

(65) Prior Publication Data

US 2018/0249044 A1 Aug. 30, 2018

(30) Foreign Application Priority Data

Feb. 28, 2017 (JP) .............................. JP2017-035932

(51) Int. Cl.
*H04N 1/409* (2006.01)
*G03G 15/00* (2006.01)
(Continued)

(52) U.S. Cl.
CPC ....... *H04N 1/4095* (2013.01); *G03G 15/5025* (2013.01); *H04N 1/6094* (2013.01);
(Continued)

(58) Field of Classification Search
None
See application file for complete search history.

(56) References Cited

U.S. PATENT DOCUMENTS

2005/0219367 A1* 10/2005 Kanda ................ H04N 1/00209
348/207.2
2008/0007785 A1* 1/2008 Hashii .................. H04N 1/4072
358/3.01
(Continued)

FOREIGN PATENT DOCUMENTS

CN 102523364 A 6/2012
CN 104917930 A 9/2015
(Continued)

OTHER PUBLICATIONS

Tanaka, JP 2012-160833, Aug. 23, 2012, English Translation (Year: 2012).*

*Primary Examiner* — Miya J Williams
(74) *Attorney, Agent, or Firm* — Canon U.S.A., Inc. IP Division

(57) ABSTRACT

A target area of image data of a scanned document is set, in which the target area has a predetermined size and a target pixel, characteristic amounts indicating the brightness at two pixels among the plurality of pixels included in the set target area are obtained, a determination is made on whether or not the difference between the obtained characteristic amounts indicating the brightness is higher than a threshold, a brightness correction amount is decided based on a characteristic amount indicating the brightness of the target pixel and the result of the determination, and the brightness characteristic amount indicating the brightness of the target pixel is corrected based on the decided correction amount.

12 Claims, 16 Drawing Sheets

(51) Int. Cl.
*H04N 1/60* (2006.01)
*H04N 1/00* (2006.01)
*H04N 1/40* (2006.01)

(52) U.S. Cl.
CPC ..... *H04N 1/00005* (2013.01); *H04N 1/00026* (2013.01); *H04N 1/409* (2013.01); *H04N 1/40087* (2013.01); *H04N 1/4092* (2013.01); *H04N 2201/0081* (2013.01); *H04N 2201/0082* (2013.01); *H04N 2201/0091* (2013.01); *H04N 2201/0094* (2013.01)

(56) References Cited

U.S. PATENT DOCUMENTS

| | | | |
|---|---|---|---|
| 2008/0106569 A1* | 5/2008 | Suwa | B41J 2/2132 347/19 |
| 2009/0190181 A1* | 7/2009 | Ohkawa | H04N 1/4095 358/3.23 |
| 2012/0127371 A1* | 5/2012 | Watanabe | G06T 5/007 348/687 |
| 2015/0215489 A1* | 7/2015 | Kamisoyama | H04N 1/02815 358/475 |
| 2015/0256715 A1* | 9/2015 | Ikari | H04N 1/4095 358/3.24 |
| 2015/0373227 A1 | 12/2015 | Ikari | |
| 2016/0286089 A1* | 9/2016 | Mori | H04N 1/6008 |

FOREIGN PATENT DOCUMENTS

| | | | |
|---|---|---|---|
| JP | 2012-160883 A | | 8/2012 |
| JP | 2012160883 A | * | 8/2012 |
| JP | 5645689 B2 | | 12/2014 |

\* cited by examiner

FIG. 10

| VARIANCE VALUE | 0 | 1 | 2 | 3 | ... | 127 | 128 |
|---|---|---|---|---|---|---|---|
| AVERAGE VALUE | 255 | 240 | 230 | 225 | ... | 105 | 100 |

IMAGE PROCESSING APPARATUS, IMAGE PROCESSING METHOD, AND RECORDING MEDIUM TO CORRECT CHARACTERISTIC AMOUNT OF TARGET PIXEL USING BRIGHTNESS AT TWO PIXELS IN SET TARGET AREA

BACKGROUND OF THE INVENTION

Field of the Invention

The present invention relates to an image processing technology for correcting an image obtained by scanning a document.

Description of the Related Art

In a copier, a multi-function peripheral, and the like, an issue called "show-through" may occur when a document is read by using an image scanning apparatus (scanner) mounted to those apparatuses. The "show-through" effect refers to a phenomenon in which, in a case where an image on a first side (e.g. front side or scan side) of a document is scanned by the image scanning apparatus, an image on the opposite, second side (e.g. back side or non-scan side) of the document appears in the scanned image (i.e. the scanned data), together with the image of the front side. That is, the scanned data may comprise image data corresponding to the image on the scanned side of a document, together with image data corresponding to the image on the non-scanned side of the document. In this case, it can be understood that the scanner has picked-up at least a portion of the image on the non-scanned side of the document. Herein, image data in a scanned image which corresponds to the image on the non-scanned side of a document may be referred to as a show-through image, show-through image data, second side image and/or back side image. Conversely, image data in a scanned image which corresponds to the image on the scanned side of a document may be referred to as the front side image or first side image It is clear that the show-through phenomenon mainly occurs when images are printed on both sides (on the front side and the back side) of a document. However, the show-through effect also tends to be generated and/or become more pronounced in cases where the second side (e.g. back side or non-scan side) of the document comprises a high-density image. A high-density image may be formed, for example, by printing the image with a high print/toner density setting. The show-through effect may also be dependent on the amount of light emitted by the scanner during scanning and/or the thickness of the document (or more generally the light transmission properties of the document). It will be appreciated that when this show-through effect is generated, it becomes difficult to clearly see and/or distinguish the front side image in the scanned image. In this way, the quality of the scanned image can be considered to be degraded.

To reduce the effect of show-through, the density of the scanned image as a whole can be decreased (the toner amount used for printing the scanned image is decreased) (by, for example, using the so-called "background removal function"). However, an issue with this approach is that it can reduce the density (e.g. intensity) of both the show-through image and the front side image, which can lead to an issue(s) as it can cause parts of the front side image to disappear. Indeed, parts of the front side image corresponding to low density regions of the document are particularly likely to fade or disappear because of, for example, a background removal function. Consequently, such approaches for show-through removal may also result in a low-quality scanned image.

In view of the above, for example, Japanese Patent Laid-Open No. 2012-160883 proposes a technology for obtaining a variance value of a certain range including a target pixel and executing show-through removal processing when the variance value is equal to lower than a previously determined reference. This processing focuses on a state in which a low density part of the image is represented as halftone dots and uses a characteristic that a variance value of image data in an area represented as the halftone dots becomes high. Show-through components are hardly represented as the halftone dots when viewed from the front side, and the variance value becomes low. Therefore, in a case where the variance value is lower than reference value, it is decided that the image is show-through components. In a case where the variance value is higher than or equal to a reference value, it is decided that the image is the low density part on the front side. The show-through removal processing is executed on only the image decided as the show-through components.

It is also noted that there has been a recent trend to decrease the thickness of the paper used for leaflets, magazines, and other such documents to reduce costs. This is of course an issue as the show-through effect may become greater. In particular, the density of the show-through image in the scanned data may become thicker as a result of the thinner documents. As a result, a density difference between the density of a show-through area and the density of a white area without the presence of the show-through adjacent to the show-through area is increased in a contoured part of the show-through area, and the variance value becomes high. For this reason, according to the related-art technology, the show-through removal processing is not performed in some cases in the contoured part having the high variance value of the show-through area. Consequently, the process in Japanese Patent Laid-Open No. 2012-160883 (and other such techniques) may not remove all of the show-through image data in a scanned image.

SUMMARY OF THE INVENTION

To address the above-described issues, an image processing apparatus according to an aspect of the present invention includes an obtaining unit configured to set a target area of image data and obtain characteristic amounts indicating the brightness at two pixels among the plurality of pixels included in the set target area, in which the target area has a predetermined size and a target pixel, and the image data is obtained by scanning a document, a determination unit configured to determine whether or not a difference between the characteristic amounts indicating the brightness which are obtained by the obtaining unit is higher than a threshold, a decision unit configured to decide a brightness correction amount based on a characteristic amount indicating the brightness of the target pixel and the result of the determination by the determination unit, and a correction unit configured to correct the characteristic amount indicating the brightness of the target pixel based on the brightness correction amount decided by the decision unit.

Further features of the present invention will become apparent from the following description of exemplary embodiments with reference to the attached drawings.

BRIEF DESCRIPTION OF THE DRAWINGS

FIG. 10 is a table illustrating an example of storage contents of a variance-average storage unit (LUT).

DESCRIPTION OF THE EMBODIMENTS

Hereinafter, exemplary embodiments of the present invention will be described in detail with reference to the drawings. It should be noted that the following exemplary embodiments are merely examples and are not intended to limit the scope of the present invention.

First Exemplary Embodiment

A copier 1000 will be described below as an example of an image processing apparatus according to a first exemplary embodiment of the present invention.
Apparatus Configuration
External Appearance of the Copier 1000

Figure 1:
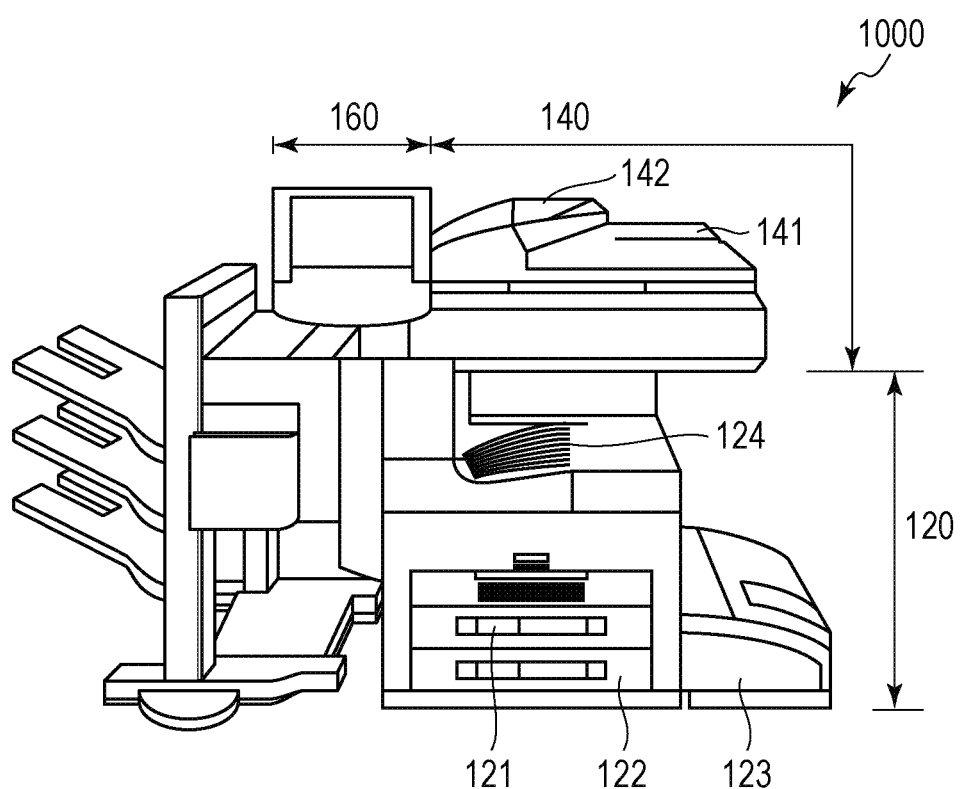
FIG. 1 illustrates an external view of a copier according to a first exemplary embodiment.

FIG. 1 illustrates the external appearance of the copier 1000 for illustrative purposes according to the first exemplary embodiment. The copier 1000 scans a document set in a document feeder 141 by a scanner unit 140. The scanned image is printed on a sheet by a printer 120. The printed sheet may be output in accordance with a copying instruction, which may be accepted from a user via an operation unit 160.

The scanner unit 140, when performing a scan, exposes the image on the document with light from an illumination lamp. Light reflected from the image is then directed to a linear image sensor, or any other type of image sensor such as a CCD sensor. The reflected light is representative of the image on the document. The linear image sensor converts the received light into electrical signals. It will be appreciated that the electrical signals from the image sensor also provides information of the image on the document. The scanner unit 140 further converts the electric signals into luminance signals including respective colors of R, G, and B, and outputs the luminance signals to a controller 200 (see FIG. 3). In this embodiment, the luminance signals provide image data, as discussed further below.

Figure 2:
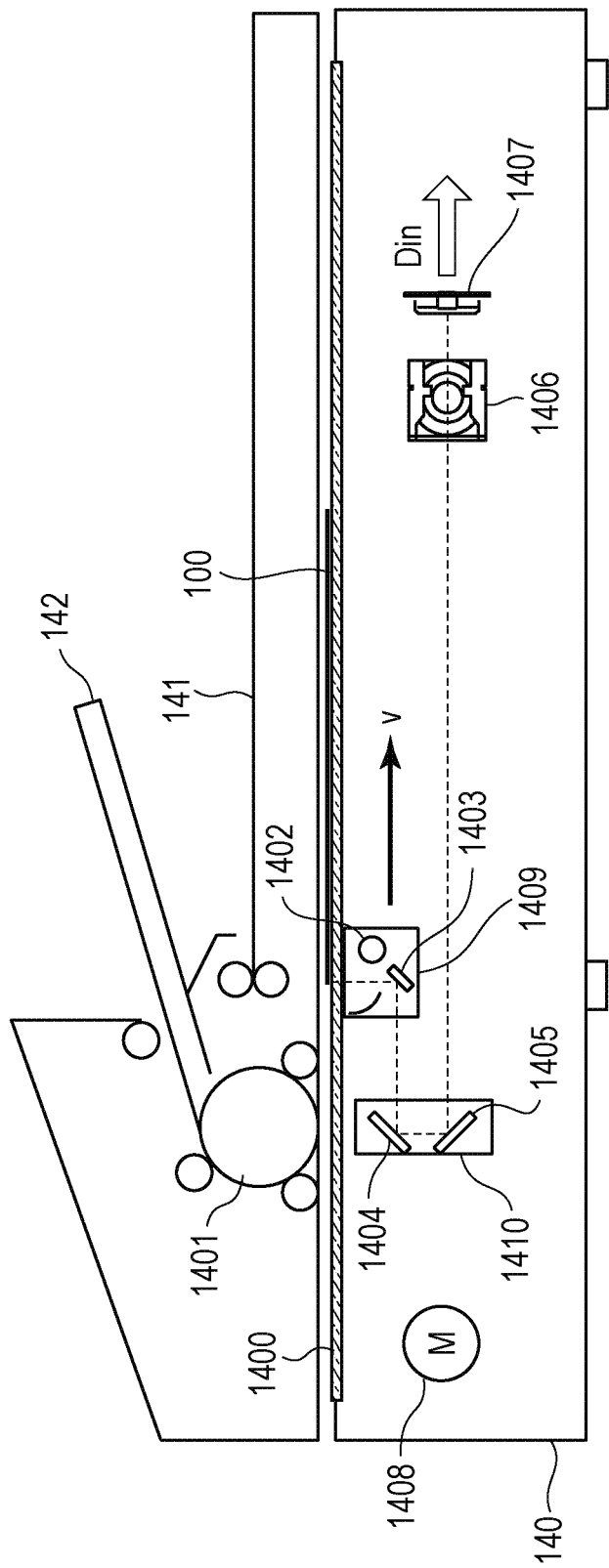
FIG. 2 is a cross sectional view illustrating the structure of a scanner unit of the copier in FIG. 1.

The document is set on a tray 142 of the document feeder 141 (see FIG. 2). When the user instructs scanning to start from the operation unit 160, the controller 200 transmits a document scanning instruction to the scanner unit 140. When the scanner unit 140 receives the scanning instruction, the scanner unit 140 feeds each document one by one from the tray 142 of the document feeder 141 and performs a document scanning operation. The scanner unit 140 can also scan a document when the document is placed on a platen glass which will be described below.

The printer 120 is an image forming device configured to form (e.g. print) image data received from the controller 200 onto a sheet. Preferably, herein, the image forming device forms (e.g. prints) the image data onto a sheet by using an electrophotographic method. The electrophotographic method may use a photosensitive drum, a developing unit, a fixing unit, and the like. The electrophotographic method is a method of transferring toner adhered onto the drum onto a sheet to be fixed. To cope with different sheet sizes or different sheet orientations, the printer 120 is provided with a plurality of sheet cassettes 121, 122, and 123. After forming the image data onto the sheet, the sheet is discharged to a discharge tray 124.
Scanner Unit FIG. 2 is a cross sectional view illustrating a structure of a scanner unit 140 for illustrative purposes. Herein, FIG. 2 illustrates main components of the scanner unit 140.

A document 100 to be scanned is placed on a platen glass 1400. The document 100 is irradiated with light from an illumination lamp 1402 and as mentioned above some of this light may be reflected by the document. This reflected light may be directed onto a CCD sensor 1407 (e.g. a linear CCD sensor) by mirrors 1403, 1404, and 1405, and focused on onto the CCD sensor 1407 by lens 1406. In this way, the CCD sensor 1407 images the reflected light. The scanner unit 140 also includes a first mirror unit 1409 and a second mirror unit 1410. The first mirror unit 1409 includes mirror 1403 and the illumination lamp 1402, and moves at a speed v to scan a front face of the document 100. The second mirror unit 1410 includes mirrors 1404 and 1405, and moves at a speed ½v to scan a front face of the document 100. The first mirror unit 1409 and the second mirror unit 1410 are driven by a motor 1408. The reflected light input to the CCD sensor 1407 is converted into an electric signal by the CCD sensor. Preferably, each pixel of the CCD upon which reflected light in incident provides an electrical signal. The electric signal at each pixel is converted into digital data by an analog-to-digital converter (which is not illustrated in the drawings). The digital data from each pixel is input as a pixel signal Din to the controller 200, as described further below.

The scanner unit 140 can also perform a scanning operation by scanning the document by way of "skimming-through" while the document feeder 141 is operated. In the skimming-through processing, the document 100 is first placed on the tray 142. Subsequently, the document is conveyed by a driving roller 1401 from the tray 142 to pass over the surface of the platen glass 1400 (e.g. the surface of the platen glass 1400 below the driving roller 1401) and then onto the document feeder 141. Preferably, the driving roller 1401 pass the document over the surface of the platen glass one time before then passing the document to the document feeder 141. In the skimming-through processing, an optical system such as the first mirror unit 1409 and the second mirror unit 1410 stays in a fixed position and is not moved. That is, the first mirror unit 1409 is fixed in a position below the driving roller 1401 and scans the document conveyed to the position below the driving roller 1401 by the driving roller 1401. In this skimming-through processing, since it is sufficient when the document is moved in a certain direction, it is possible to continuously scan a large number of documents at a high speed.

In some cases, the document may have images (such as photographs, graphical representations, and characters) printed on both of its sides. That is, some documents may have images on their front side (i.e. the side irradiated with light from the illumination lamp 1402 when the document 100 is scanned) and also their back side (i.e. the side which is not directly irradiated with light from the scanner during scanning). For such documents, "show-through" may be generated in which the image on the side where the scanning is not performed (back side) affects the scanned image data of the front side. This phenomenon may occur in either of the above-described scanning methods. In addition, the degree of the show-through varies depending on the thickness (and/or, more generally, the light transmission properties) of the document 100 (which may be a medium such as paper). The degree of show-through may additionally or alternatively depend on the amount of irradiation light from the illumination lamp 1402. In general, the degree of show-through is enhanced as the paper of the document is thinner or the light amount of the irradiation is higher. Moreover, the degree of the show-through is also affected by a density value (e.g. print density) of the image printed on the back side. The show-through is more likely to occur as the density of the printed image is higher.

Hardware Configuration of the Copier

Figure 3:
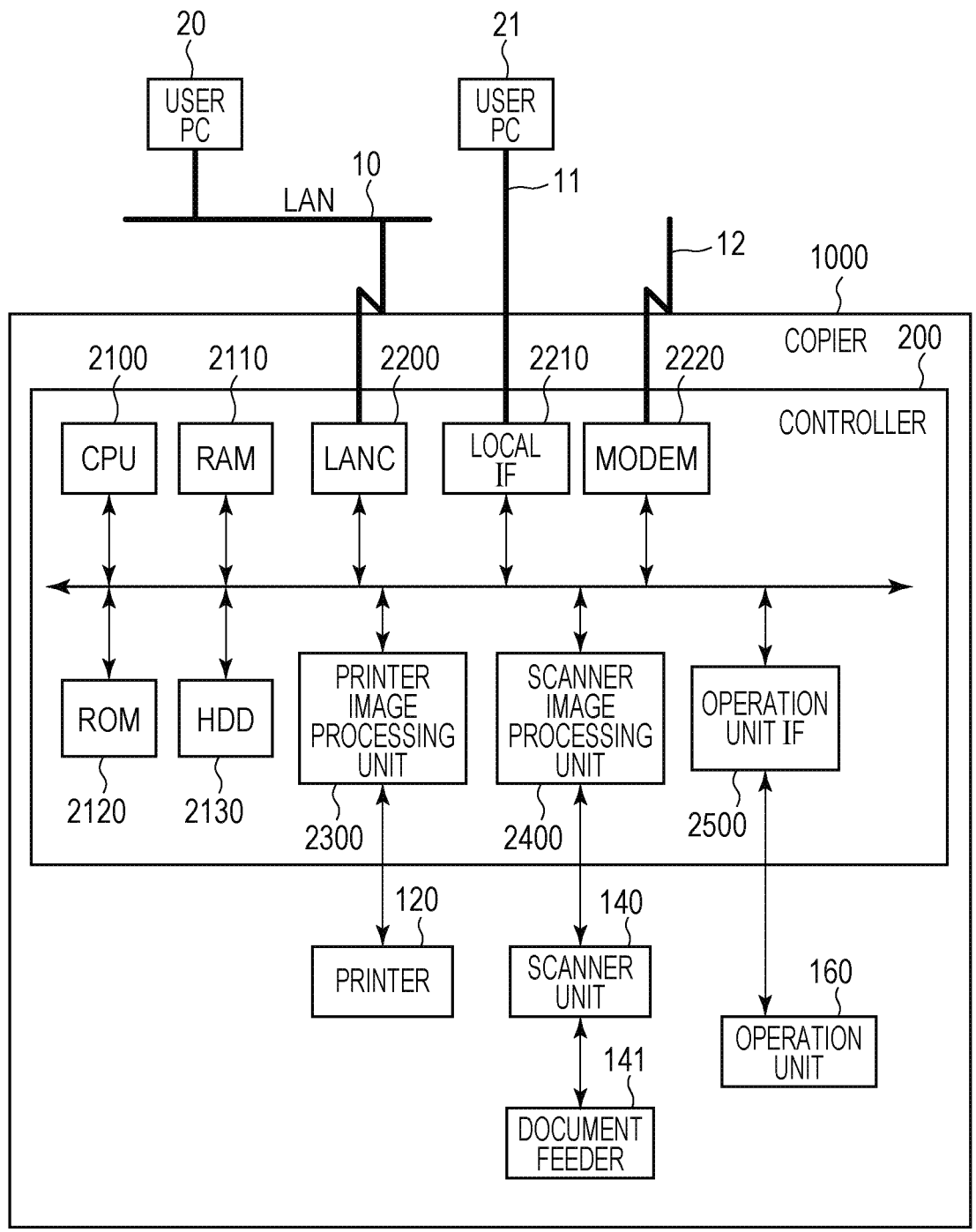
FIG. 3 illustrates a hardware configuration of the copier of the copier in FIG. 1.

FIG. 3 illustrates a hardware configuration of the copier 1000 for illustrative purposes. The controller 200 is connected to the scanner unit 140 functioning as an image input device, the printer 120 functioning as an image output device, a local area network (LAN) 10, and a public line (WAN) 12. The controller 200 controls the operations of the copier 1000 in an overall manner and also performs input and output controls of the image information and device information.

A central processing unit (CPU) 2100 is a processor configured to control the entirety of the copier 1000. For example, the CPU 2100 controls accesses to connected various devices in an overall manner on the basis of a control program stored in a ROM 2120 or the like. Furthermore, the CPU 2100 controls various image processings performed inside the controller 200 in an overall manner. The RAM 2110 is a system work memory and is also an image memory that temporarily stores image data and the like. The ROM 2120 is a boot ROM and stores a boot program of a system. A hard disk drive (HDD) 2130 stores information (system software) mainly used for activating and operating a computer and the image data. These pieces of data may be stored in not only the HDD 2130 but also a recording medium that can hold memory.

A LAN controller 2200 connects the copier 1000 to the LAN 10 to perform input and output of information related to input and output of the image data for the output and device control with a user a personal computer (PC) 20. A local interface (I/F) 2210 is an interface such as a universal serial bus (USB) or Centronics and is connected to a user PC 21 via a cable 11 and performs input and output of the data. A MODEM 2220 is connected to the copier 1000 and the public line 12 and performs input and output of the data with a PC in a remote place which is not illustrated in the drawing or the like.

A printer image processing unit 2300 is connected to the printer 120 and performs a communication with the CPU mounted to the printer 120. The printer image processing unit 2300 also performs conversions of synchronous and asynchronous systems on the image data and image processing for performing print output in accordance with a command of the CPU 2100. The scanner image processing unit 2400 is connected to the scanner unit 140 and performs a communication with the CPU mounted to the scanner unit 140. The scanner image processing unit 2400 also performs the conversions of the synchronous and asynchronous systems on the image data and image processing such as show-through correction processing which will be described below. An operation unit interface (I/F) 2500 is an interface for outputting the image data to be displayed on the operation unit 160 from the controller 200 to the operation unit 160. The operation unit interface (I/F) 2500 is also an interface for outputting information input by the user via the operation unit 160 to the controller 200.

Scanner Image Processing Unit

Figure 4:
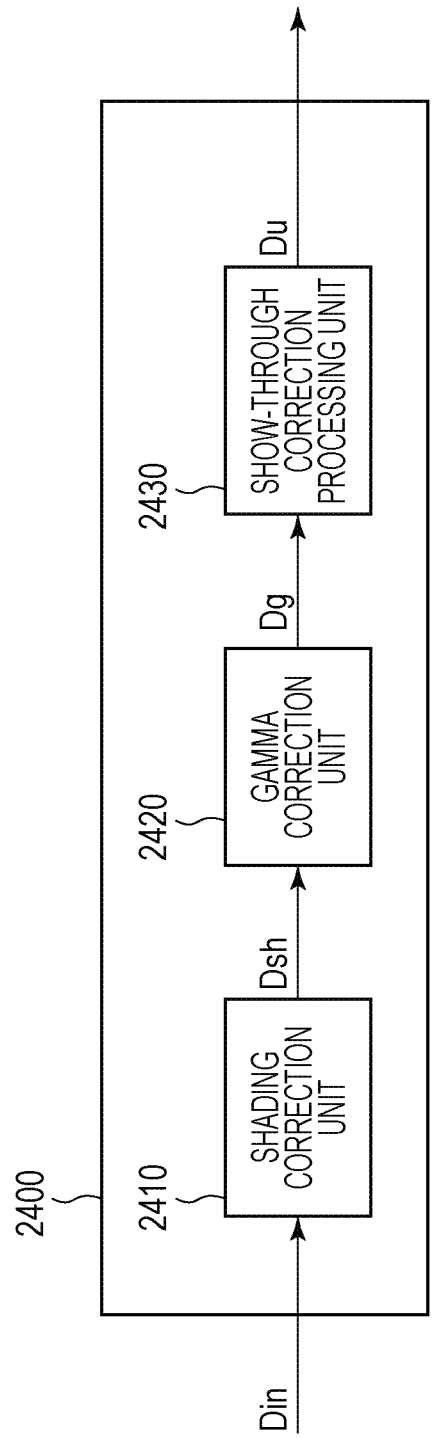
FIG. 4 is a block diagram illustrating the configuration of a scanner image processing unit.

FIG. 4 is a block diagram illustrating a configuration of the scanner image processing unit 2400 according to the first exemplary embodiment. A shading correction unit 2410 receives, as an input, a characteristic amount indicating brightness of the scanned image which is output by the scanner unit 140 (e.g. the correction unit 2410 receives the pixel signal Din indicating a luminance or other brightness value of the scanned image). The shading correction unit 2410 performs correction processing to correct luminance unevenness to obtain an image having uniform brightness. Unevenness in the luminance of a scanned image may be caused by, for example, certain characteristics of an optical system and an imaging system, and the correction may be performed by using a related-art technology. A pixel signal Dsh on which shading correction processing has been performed is output to a gamma correction unit 2420 in a subsequent stage.

The gamma correction unit 2420 performs a correction for compensating a difference between a color characteristic of a scanning element and a color characteristic of the device by using a related-art technology. A pixel signal Dg on which gamma correction processing has been performed is output from the scanner image processing unit 2400 to be written into the RAM 2110 and temporarily saved. Furthermore, the pixel signal Dg is output to a show-through correction processing unit 2430 in parallel with the above-described output.

In a case where the show-through is generated in the scanned image data of the front side of the document scanned by the scanner unit 140, the show-through correction processing unit 2430 executes processing for reducing the show-through. More particularly, the show-through correction processing unit 2430 may (i) generate show-through correction information providing an index of the show-through correction, and (ii) execute show-through correction using the generated correction information.

A pixel signal Du on which the show-through correction processing has been performed is output from the scanner image processing unit 2400 and written into the RAM 2110 by a memory controller (not illustrated in the drawings) to be temporarily saved.

Show-Through Correction Processing Unit

Figure 5:
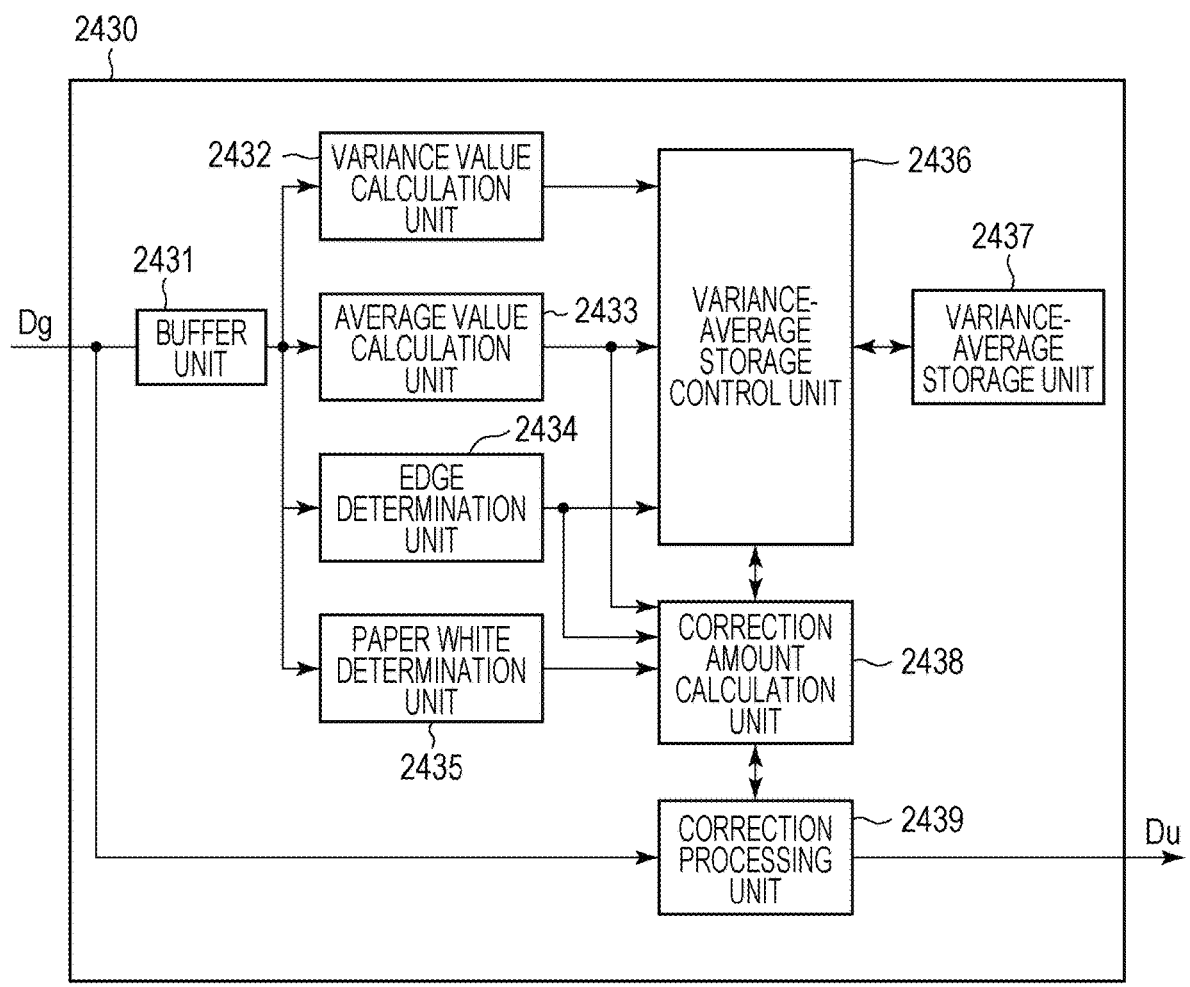
FIG. 5 is a block diagram providing an example of the configuration of a show-through correction processing unit.

FIG. 5 is a block diagram illustrating a detailed configuration of the show-through correction processing unit 2430. A buffer unit 2431 is a buffer that temporarily stores the pixel signal Dg. The buffer unit 2431 is used to perform calculations which may be executed in subsequent stages. In particular, the buffer unit 2431 may be used to refer to (e.g. retrieve) pixel signals in a given window when performing a subsequent variance value calculation, average value calculation, and edge determination process. The window may have a predetermined size which may be set based on a target pixel which is to be located in the center of the window. The size of the buffer may be set according to the window size. For example, in a case where pixel signals in a 5×5 window is to be referred, the buffer size may adopt a 5-line configuration, and the buffer size in the case of a 7×7 window may adopt a 7-line configuration.

A variance value calculation unit 2432 collectively receives the pixel signals from the buffer unit 2431. Preferably, the received pixel signals include those which correspond to the pixels in the window. Based on the pixel signals, the variance value calculation unit 2432 executes a calculation of a variance value (degree of variation). For example, the variance value is calculated by the following expression (1).

$$\text{Variance value } (\sigma^2) = \frac{1}{N}\sum_{k=1}^{N}(x_k - x_a)^2 \quad (1)$$

Where
N: The number of pixels in the target window
Xk: A $k^{th}$ pixel signal value in the target window
Xa: An average value of pixel signal in the target window.

It should be noted that, since the variance value ($\sigma^2$) tends to take a large value, this may be replaced with a standard deviation ($\sigma$) in some examples.

An average value calculation unit 2433 collectively receives the pixel signals from the buffer unit 2431. Preferably, the received pixel signals include those which correspond to the pixels in window. Based on the pixel signals, the average value calculation unit 2433 executes the calculation of the average value as a representative value representing pixel values for the window size. For example, the average value is calculated in accordance with the following expression (2).

$$\text{Average value } (x_a) = \frac{1}{N}\sum_{k=1}^{N}x_k \quad (2)$$

Definitions of the respective parameters are similar to the expression (1). It should be noted that the window size used for the average value calculation and the window size used for the variance value calculation are set to be the same.

An edge determination unit 2434 collectively receives the pixel signals from the buffer unit 2431. Preferably, the received pixel signals include those which correspond to the pixels in window. Based on the received pixel signals, the edge determination unit 2434 determines whether or not the target pixel is in the edge area. The edge determination may be performed by using a related-art technology. Specifically, a Prewitt filter or a Sobel filter is applied to the pixels which are in a window where the target pixel is set as the center, and a calculation result is subjected to a threshold determination to determine whether or not the area is an area where an image edge exists.

A paper white determination unit 2435 determines whether or not a target pixel belongs to a paper white area. One pixel arbitrarily set from the pixels included in the image is set as the target pixel. The paper white area refers to an area where the pixel on the front side does not exist. Therefore, when the pixel on the front side does not exist, it is determined that the target pixel belongs to the paper white area.

Figure 6:
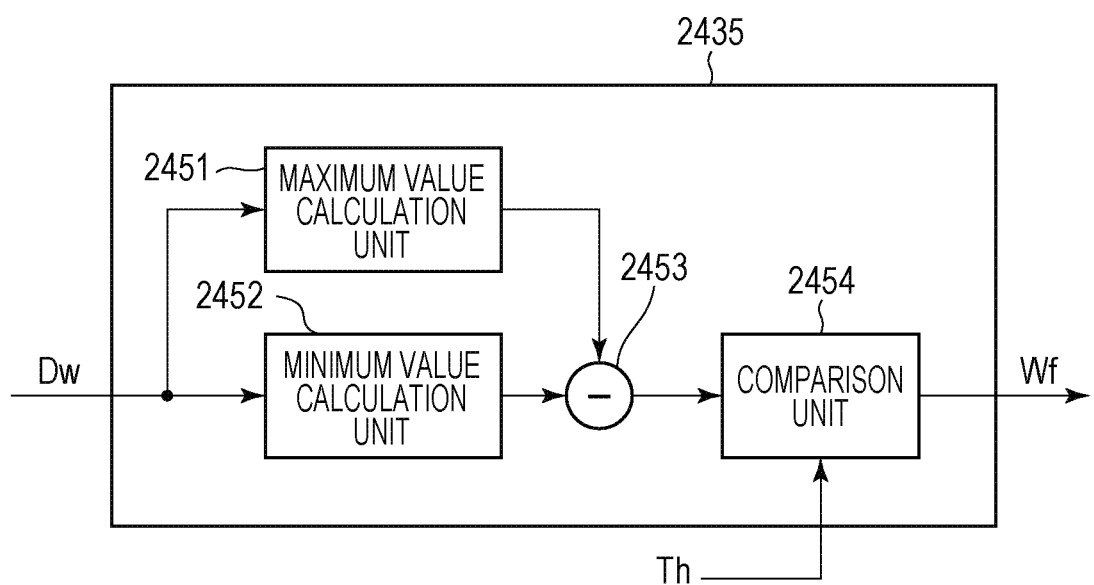
FIG. 6 provides an example of the configuration of a paper white determination unit.

FIG. 6 illustrates an example of the paper white determination unit 2435 according to the present exemplary embodiment. For example, when the buffer unit 2431 temporarily stores pixel signals of the pixels that are contained in the 5×5 window, the pixel signals of the 25 pixels are input at the same time as Dw from the buffer unit 2431.

A maximum value calculation unit 2451 obtains the most luminous pixel signal among the input pixel signals Dw. A minimum value calculation unit 2452 obtains the least luminous pixel signal among the input pixel signals Dw. The obtained pixel signals are both input to a subtractor 2453. The subtractor 2453 subtracts the least luminous pixel signal (minimum value) from the most luminous pixel signal (maximum value) and calculates a luminance difference between the maximum value and the minimum value. It should be noted that a luminance difference between the second most luminous pixel signal after the most luminous pixel signal and the second least luminous pixel signal after the least luminous pixel signal may also be calculated to avoid an influence from noise included in the image in the paper white determination unit 2435.

Next, a comparison unit 2454 compares the calculated maximum minimum luminance difference with a threshold Th and determines whether or not the maximum minimum luminance difference is higher than the threshold Th. When the maximum minimum luminance difference is lower than or equal to the threshold, it is determined that the target pixel is not the paper white area, and a paper white determination result Wf is set as 0. On the other hand, when the maximum minimum luminance difference is higher than the threshold Th, it is determined that the target pixel is the paper white area, and the paper white determination result Wf is set as 1. The paper white determination result Wf is used by the correction amount calculation unit 2438 which will be described below.

A variance-average storage control unit 2436 controls write and read of data with respect to a variance-average storage unit 2437. Herein, the variance-average storage unit 2437 stores the variance value calculated by the variance value calculation unit 2432 and the average value calculated by the average value calculation unit 2433. In particular, in the following explanation, descriptions will be given while an average value for each variance is stored in the format of a look-up table (LUT). For example, the variance value is set as an address of the LUT, and an average value associated with the address (variance value) is stored as data.

Specifically, the variance-average storage control unit 2436 obtains an edge determination result determined by the edge determination unit 2434 to check whether or not the target pixel is the area where the image edge exists. When the target pixel is the area where the image edge exists, the data is not written into the variance-average storage unit 2437. On the other hand, in a case where the target pixel is not the area where the image edge exists, the variance-average storage control unit 2436 reads out the average value associated with the variance value output from the variance value calculation unit 2432 from the variance-average storage unit 2437. That is, the variance-average storage control unit 2436 accesses the address of the LUT having the same value as the referred variance value and reads out the data (average value).

The variance-average storage control unit 2436 compares the read average value with the average value output by the average value calculation unit 2433. In a case where the average value output by the average value calculation unit 2433 is higher than the read average value, the variance-average storage control unit 2436 writes the higher average value into the variance-average storage unit 2437. That is, the read data of the address of the LUT is updated by the higher value. The above-described processing is performed with respect to all the pixel positions in the document, and the variance-average storage unit 2437 stores the highest average value for each variance value in the document. The thus stored highest average value for each variance value is set as show-through correction information Inf. The variance-average storage control unit 2436 also reads out the average value associated with the predetermined variance value in accordance with a request from a show-through correction processing unit 2440 which will be described below and performs processing of outputting to the show-through correction processing unit 2440 in parallel. Here, a meaning of the show-through correction information Inf will be described with reference to FIG. 8.

Figure 8:
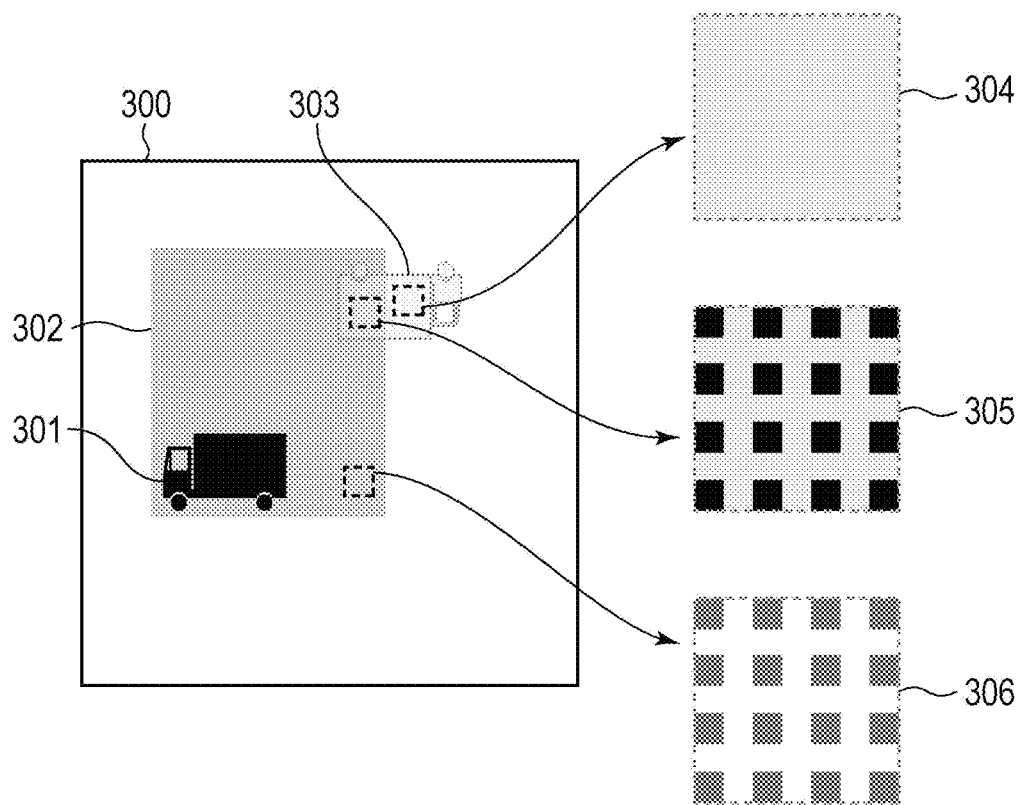
FIG. 8 illustrates scanned image data of the copier for illustrative purposes.

FIG. 8 illustrates the scanned image data 300 obtained by scanning the document by the scanner unit 140 for illustrative purposes. Specifically, FIG. 8 illustrates the scanned image data 300 including a show-through image 303. In FIG. 8, halftone dots generated by dither processing using a dither matrix by the printer are printed on the document 100. It should be noted that halftone processing by the printer is not limited to the dither matrix and may also be error diffusion processing. In a case where halftone dots generated by the error diffusion processing are printed on the document too, the show-through correction processing according to the present exemplary embodiment can be applied to the configuration. Only a high density image 301 (image of a truck) and a halftone image 302 (rectangular image) represented by halftone dots are formed on the front side of the document 100. In addition, an image similar to the high density image 301 is formed on the back side of the document 100 (opposite side to the side scanned by the scanner). At this time, the high density image present on the back side of the document 100 is generated in the image data 300 scanned by the scanner unit 140 as the show-through image 303 (image of the inverted truck). Characteristics of the respective areas in the scanned image data 300 will be described.

A focused area in the halftone image 302 is illustrated as a halftone target area 306. The halftone target area 306 adopts the halftone dot structure and is divided into the area where the halftone dots are printed and the area where the halftone dots are not printed. Herein, this area is sectioned into a predetermined window size to calculate the variance value and the average value of the pixel luminance. The variance value is set as "X2", and the average value is set as "Y2". Herein, while a size of a single halftone dot is set as a pixel reference, a size of 5×5 pixels is specified as the window size, for example.

An expanded view of a focused area in the show-through image 303 is illustrated as a show-through target area 304. In the show-through target area 304, this area is sectioned into a predetermined window size to calculate the variance value and the average value of the luminance. The variance value is set as "X1", and the average value is set as "Y3".

Herein, the variance value "X1" obtained by the show-through target area 304 takes a small value. This is because, in general, only the low frequency components of the image on the back side tend to appear as the show-through components (image components obtained while being transmitted through the sheet). For this reason, even when the image on the back side corresponding to the show-through image 303 is drawn by the halftone dots, the image is generated without unevenness of the density (luminance) as the show-through components in many cases, and the variance value takes a small value as a result.

The variance value obtained by sectioning the paper white area where no images exist without the presence of the show-through in the scanned image data 300 into a predetermined window size is set as "X1", and the average value is set as "Y4". It should be noted that, as described above, since the show-through components hardly affect the variance value, the variance value of the paper white area and the variance value obtained from the area of the show-through image 303 tend to have similar values. For this reason, herein, the variance values are commonly set as "X1".

An expanded view of a focused area where the halftone image 302 and the show-through image 303 are overlapped with each other is illustrated as an overlapped target area 305. Since the overlapped target area 305 adopts the halftone dot structure, the overlapped target area 305 is divided into the area where the halftone dots are printed and the area where the halftone dots are not printed. However, dark (low luminance) pixel values as a whole are obtained due to the influence of the show-through image. In the overlapped target area 305, this area is sectioned into a predetermined window size to calculate the variance value and the average value. The variance value is set as "X2", and the average value is set as "Y1". It should be noted that, as described above, since the show-through components hardly affect the variance value, the variance value of the overlapped target area 305 and the variance value obtained from the halftone target area 306 of the halftone image 302 without the presence of the show-through tend to have similar values. For this reason, herein, the variance values are commonly set as "X2".

Figure 9:
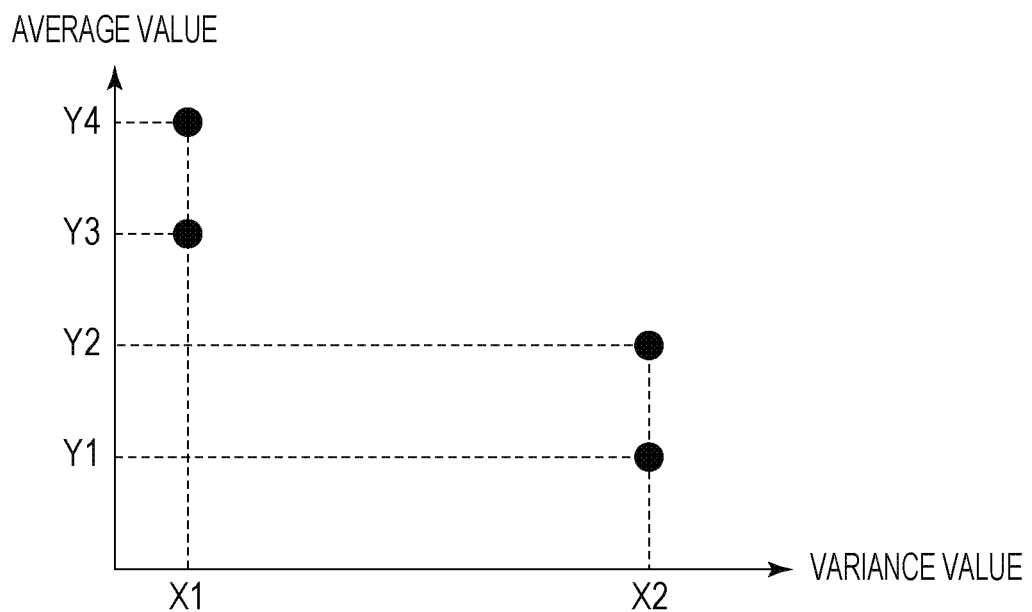
FIG. 9 illustrates a relationship between the variance in the luminance of the scanned image data and an average value.

FIG. 9 illustrates a relationship among the variance values X1 and X2 and the average values Y1 to Y4 in the scanned image data 300. In FIG. 9, it is indicated that the coordinates (X1, Y4) correspond to the paper white area, the coordinates (X1, Y3) correspond to the show-through target area 304, the coordinates (X2, Y2) correspond to the halftone target area 306, and the coordinates (X2, Y1) correspond to the overlapped target area 305. That is, it can be mentioned that the paper white area is at the coordinates (X1, Y4), and a state in which the show-through appears in the paper white area corresponds to the coordinates (X1, Y3). In addition, it can be mentioned that the halftone target area 306 is at the coordinates (X2, Y2), and a state in which the show-through appears in the halftone area corresponds to the coordinates (X2, Y1). The average value of FIG. 9 is an average value of brightness (for example, luminance), and it means that Y4 has a higher luminance than Y1.

Therefore, when the target pixel is corrected by using a difference between Y3 and Y4 in the show-through target area 304, the signal value of the show-through area is corrected to the signal value of the paper white area, and the show-through correction is appropriately performed. When the target pixel is corrected by using a difference between Y1 and Y2 in the overlapped target area 305, the signal value of the overlapped area is corrected to the signal value of the halftone target area, and the show-through correction is appropriately performed. In other words, the average value in the area without the presence of the show-through can be set as the index (that is, the show-through correction information Inf) for correcting the show-through in the respective variance values.

Herein, the variance value depends on the amount of halftone dots in the target area. The amounts of halftone dots is represented by a percentage (0 to 100%) of the number of significant printed pixels included in the target area to the total number of pixels in the target area, for example, and uniquely determined in accordance with the printed image density. Therefore, it may be understood that, even in a case where the show-through area or an area where the show-through and the halftone dots on the front side are overlapped with each other is generated, the show-through can be appropriately corrected by correcting the signal value while the average value without the presence of the show-through for each variance value is set as the index. It should be noted that "storage of the average value for each variance value" is, in other words, "storage of the average value for each halftone dot amount".

It should be noted however that the average value in the area without the presence of the show-through is to be obtained to obtain the appropriate index. To simply and also appropriately obtain the index, the highest average value for each variance value is used as the index in the input image data as described in the variance-average storage control unit 2436. This configuration uses a phenomenon that the area without the presence of the show-through takes a higher (more luminous) average value than the area with the presence of the show-through. Since the entire halftone dot area in the input image data is rarely included in the show-through area, this technique may be sufficiently adequate for practical use.

Even in a case where the most luminous average value in the image area that has been previously processed before reaching the currently processed target pixel in the input image as in the present exemplary embodiment is set as the show-through correction information, it is possible to store the appropriate show-through correction information. This is because only the show-through areas are rarely continuous in the real document, and it is conceivable that the above-described technique may be sufficiently adequate for practical use also in the modes of the present exemplary embodiment.

Figure 7:
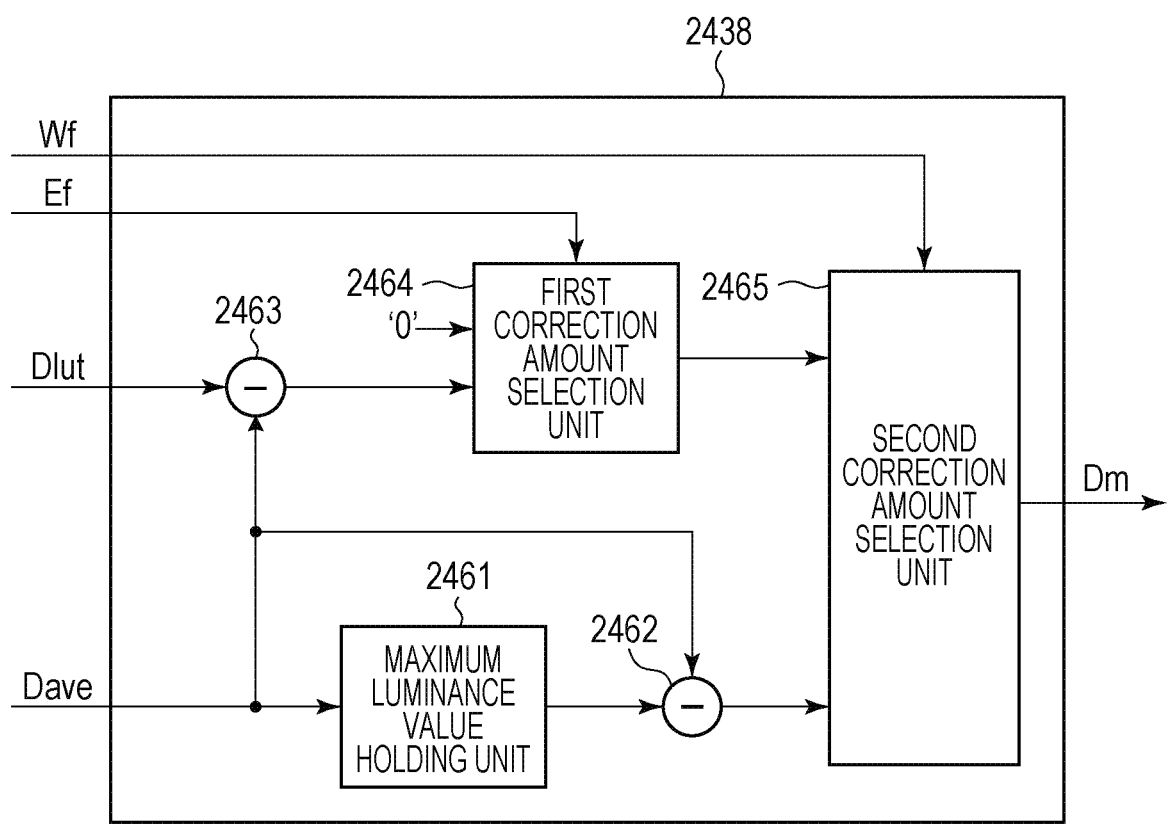
FIG. 7 provides an example of the configuration of a correction amount calculation unit according to the first exemplary embodiment.

Next, a correction amount calculation unit 2438 in FIG. 5 calculates a correction amount for correcting the pixel signal Dg. FIG. 7 illustrates a detail of the correction amount calculation unit 2438. A pixel signal "Dave" is an average value in the current target area which is calculated by the average value calculation unit 2433. A pixel signal "Dlut" is an average value received from the variance-average storage control unit 2436. This average value received from the variance-average storage control unit 2436 the variance value similar to the variance value in the target position as described above and indicates the most luminous average value in the previously processed pixels. A signal Ef is an edge determination result received from the edge determination unit 2434, and a signal Wf is a paper white determination result received from the paper white determination unit 2435.

A maximum luminance value holding unit 2461 stores and holds the most luminous pixel signal value (maximum value) among the sequentially input pixel signals Dave. In a case where the currently input pixel signal Dave is compared with the currently held maximum luminance value and the input pixel signal Dave is more luminous, the held maximum luminance value is updated by the input pixel signal value. On the other hand, in a case where the currently input pixel signal Dave is compared with the currently held maximum luminance value and the input pixel signal Dave is darker, the held maximum luminance value is not updated.

Next, a subtractor 2462 subtracts the currently input pixel signal Dave from the maximum luminance value held by the maximum luminance value holding unit 2461 to calculate a difference. The calculated difference from the maximum luminance value is output to a second correction amount selection unit 2465.

On the other hand, a subtractor 2463 subtracts the currently input pixel signal Dave from the pixel signal Dlut received from the variance-average storage control unit 2436 to calculate a difference. It should be noted that, in a case where the difference takes a negative value herein, since it is determined that the average value in the target area is more luminous than the average value stored in the variance-average storage control unit 2436, the correction amount is set as 0. The difference calculated herein means a difference between Y2 and Y1 illustrated in FIG. 9 as an example. The calculated difference between the luminance values is output to a first correction amount selection unit 2464.

The first correction amount selection unit 2464 refers to an edge determination result Ef and selects whether to output the difference between the signal values which is calculated by the subtractor 2463 as a candidate of the correction amount or output 0. In a case where the edge determination result Ef is 1 and the target area is the edge, 0 is output as the candidate of the correction amount. In addition, a predetermined correction amount that has been previously determined may be output instead of 0. Since an image boundary such as the edge area is affected by a different image area and the variance value is generated irrespective of the halftone dot structure of the pixels on the front side, the correction based on the pixel signal Dlut received from the variance-average storage control unit 2436 does not realize the correct correction in some cases. Therefore, the correction amount is set as 0 in this case. In addition, since the signal values of the pixels on the front side are dense in the edge area, the show-through is not generated, and no issue occurs even when the correction is not performed.

In a case where the edge determination result Ef is 0 and the target area is not the edge, the first correction amount selection unit 2464 outputs the difference between the signal values which is calculated by the subtractor 2462 as the candidate of the correction amount.

Next, the second correction amount selection unit 2465 refers to the paper white determination result Wf and selects whether to output the signal value output by the first correction amount selection unit 2464 as a correction amount Dm or output the difference between the signal values which is calculated by the subtractor 2462 as the correction amount Dm. In a case where the paper white determination result Wf is 1 and the target area is the paper white area, the difference between the pixel signal currently input and the maximum luminance value which is calculated by the subtractor 2462 is output as the correction amount. This is because, in a case where the show-through appears in the paper white area and the current target area falls into a contoured part of the show-through, the variance value is generated, and the correction based on the pixel signal Dlut received from the variance-average storage control unit 2436 does not realize the correct correction. The correction based on the pixel signal Dlut means the correction based on the output result of the first correction amount selection unit. In view of the above, the difference from the held maximum luminance value is output as the correction amount. In other words, the index for the correction is forcedly replaced with a paper white luminance value (maximum luminance value). In a case where the paper white determination result Wf is 0 and the target area is not the paper white area, the second correction amount selection unit 2465 outputs the value input from the first correction amount selection unit 2464 as the correction amount Dm.

Next, a correction processing unit 2439 executes the show-through correction processing on the input pixel signal Dg based on the correction amount received from the correction amount calculation unit 2438. The show-through correction processing adds the correction amount to the luminance value of the pixel signal Dg, for example, to increase the brightness of the pixel signal Dg. At this time, when the input pixel signal is the pixel signal without the presence of the show-through, the difference is decreased, and the correction amount becomes small. In addition to the above, a gain may be used for the correction in accordance with the input pixel signal value instead of the simple addition of the correction amount. For example, since the show-through is more likely to be affected as the input pixel signal value is more luminous, a gain may also be used to perform more intense correction as the input pixel signal value is more luminous in accordance with the brightness of the pixel signal. The corrected pixel signal value is written back as Du into the RAM 2110.

Figure 11:
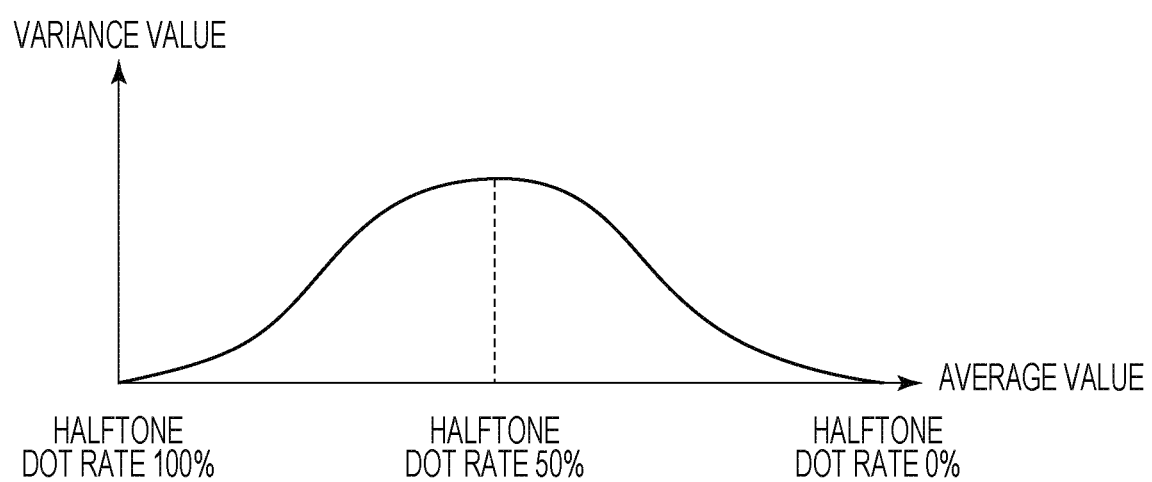
FIG. 11 is a graphic representation illustrating a relationship between a halftone dot rate in a halftone dot image, and the variance value and the average value.

The variance value of the scanned halftone dot image takes such a distribution that a distribution at and above 50% and a distribution below 50% are set to be similar to each other while the amount of halftone dots of 50% in the target area (window size) is set as an apex of the maximum value. Then, the variance value takes the minimum value at the amount of halftone dots of 0% or 100%. FIG. 11 illustrates this graphical representation. The same variance value is generated at different average values with reference to FIG. 11. However, at this time, the present show-through correction processing may set the amount of halftone dots below 50% as a target. That is, while a position at which the density of the average value becomes an intermediate density is set as a boundary, and the correction may be performed with respect to the part at or below the boundary. This is because, when the density is higher than or equal to the intermediate density, the density on the front side is high, and the influence of the show-through is hardly affected. With the above-described configuration, the relationship between the variance value and the average value becomes unique. As still another configuration, a gain may be used such that the correction amount is decreased in a case where the density is 50% or above. The processing taking the amount of halftone dots into account is implemented by the correction processing unit 2439 described above.

It should be noted that the present processing is individually executed for each color according to the present exemplary embodiment. Therefore, the variance-average storage unit 2437 individually stores the average value for the variance value for each color. When the storage is individually performed for each color, it is possible to perform the correction even when the show-through components are colored (such as, for example, show-through components of characters in red).

Here, FIG. 10 illustrates an example of the LUT configured in the variance-average storage unit 2437. The first row indicates the address of the LUT, and the second row indicates the data stored in the LUT. This address of the LUT indicates the variance value but may be replaced as the standard deviation (a) to decrease the numeric value. The meaning of the numeric value of the standard deviation also indicates the degree of the variation similarly as in the variance value. Here, the relationship between the variance value and the average value which is stored in the LUT will be described. For example, a part indicated by the variance value 0 (address 0) is either a solid color part where the influence of the show-through is not taken into account or a paper white part. Herein, since the average value stored in this LUT is the average value having the highest numeric value (most luminous) in the image, the average value stored at the address of the variance value 0 certainly becomes the paper white average value. As the variance value (address) is gradually increased, the number of pixel values of the halftone dots in the image is increased, so that the stored average value (luminance data) is decreased (darkened). Therefore, the pieces of data stored at the respective addressed of the LUT which are formed after one page of the image is referred to indicate the value illustrated in FIG. 10.

In addition, the LUT may be configured so as to have the same number of dimensions as the number of colors instead of the configuration for each color. For example, in the case of the three colors of RGB, the three dimensions including [R variance value], [G variance value], and [B variance value] may be configured, and the average values of the respective colors may be stored.

With Regard to the Processing in the Contoured Part of the Show-Through Area

Figure 12:
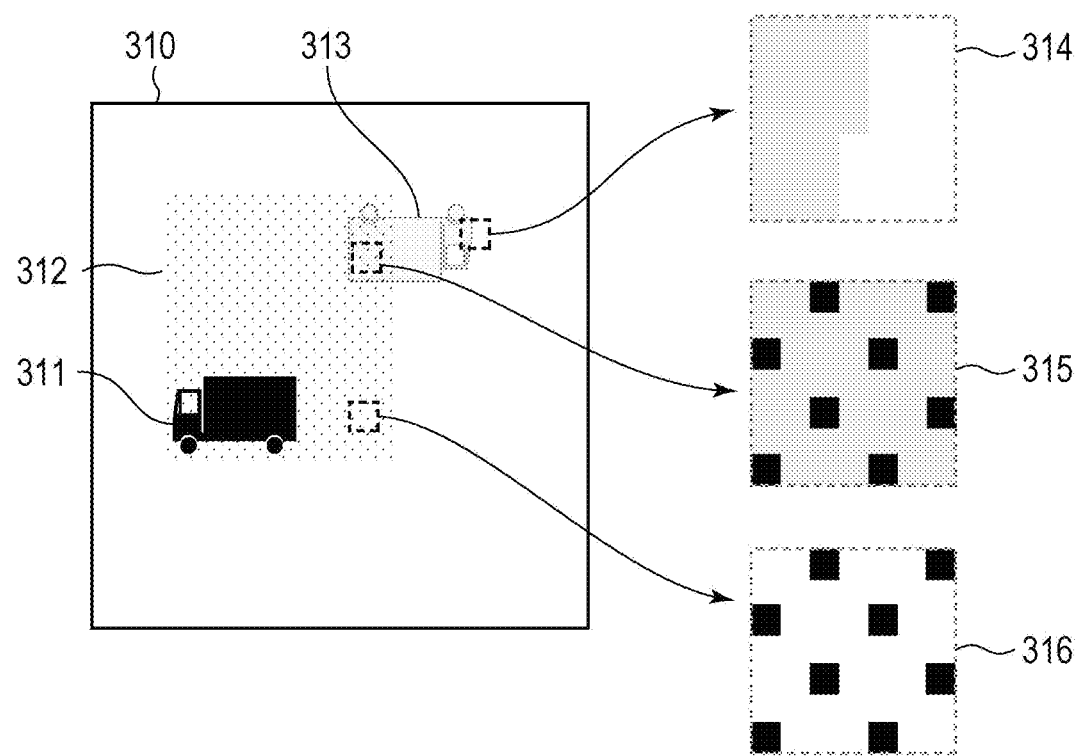
FIG. 12 illustrates a show-through contoured part of the scanned image data for illustrative purposes.

The show-through correction processing in the contoured part of the show-through area will be described with reference to FIG. 12 in detail. FIG. 12 illustrates an example of scanned image data 310 on the front side of the document 100 scanned by the scanner unit 140. Only the high density image 311 and a halftone image 312 represented by halftone dots exist on the front side of the actual document 100 as printed products. In addition, a printed product similar to the high density image 311 exists on the back side of the document 100. At this time, the high density image present on the back side of the document 100 is generated in the scanned image data 310 on the front side of the document 100 scanned by the scanner unit 140 as a show-through image 313. Herein, the halftone image 312 is a pale halftone image with respect to the halftone image 302 of FIG. 8.

Descriptions will pay attention to the respective areas of the scanned image data 310. First, a focused area in the halftone image 312 is illustrated as a halftone target area 316. Since the halftone target area 316 adopts the halftone dot structure, the halftone target area 316 is divided into the area where the halftone dots are printed and the area where the halftone dots are not printed. Herein, since the halftone image 312 is the halftone image paler than the halftone image 302 of FIG. 8, the halftone target area 316 has the amount of halftone dots fewer than that of the halftone target area 306 of FIG. 8. In this manner, the amount of halftone dots is decreased instead of printing the halftone dots in a pale manner in the pale halftone image. That is, irrespective of the density of the halftone image, the dot densities of the halftone dots are uniform. Therefore, a difference between the pixel values of the pixel having the maximum luminance (most luminous pixel) and the pixel having the minimum luminance (least luminous pixel) is large in a case where the respective pixels inside this area are compared with each other. That is, it is determined that this area is not the paper white area (the paper white determination result Wf=0) in the paper white area determination processing illustrated in FIG. 6. The halftone target area 316 has the variance value because of the halftone dot structure. However, since the amount of halftone dots is fewer than that of the halftone target area 306 of FIG. 8, the variance value takes a low value.

Next, a focused area where the halftone image 312 and the show-through image 313 are overlapped with each other is illustrated as an overlapped target area 315. Since the overlapped target area 315 adopts the halftone dot structure, the overlapped target area 315 is divided into the area where the halftone dots are printed and the area where the halftone dots are not printed. However, the overlapped target area 315 has a dark pixel value (low value) as a whole under the influence of the show-through image. Herein, since the show-through components hardly affect the variance value, the variance value of the overlapped target area 315 and the variance value obtained from the halftone target area 316 of the halftone image 312 without the presence of the show-through tend to have similar values.

Next, a boundary part of the show-through image 313 is illustrated as a show-through contour area 314. The show-through pixel exists on the left side of the area, and the right side corresponds to a white area where no pixels exist in the show-through contour area 314. Therefore, the show-through contour area 314 has a variance value although the value is small because the luminance difference between the left side and the right side in the area exists. The image on the front side (that is, the halftone dots) does not exist in the show-through contour area 314. Therefore, in a case where the respective pixels inside this area are compared with each other, the difference between the pixel values of the pixel having the maximum luminance (most luminous pixel) and the pixel having the minimum luminance (least luminous pixel) is small in a case where the respective pixels inside this area are compared with each other. That is, it is determined that this area is the paper white area (the paper white determination result Wf=1) in the paper white area determination processing illustrated in FIG. 6. Since this area has the small difference between the pixel values of the respective pixels, this area is not determined as the edge area in the edge determination unit 2434.

The above-described show-through area that is not overlapped with the image on the front side is to be corrected so as to have a luminance value equivalent to a white pixel inside the white area by the corrected. However, since this area has the variance value in no small part in the correction using the LUT of the variance value and the average value which is illustrated in FIG. 10, the variance value 0 is not selected as the index of the correction, and an expected correction result is not obtained. In view of the above, when the correction amount calculation processing illustrated in FIG. 7 is executed by using the above-described paper white determination result Wf, it is possible to correct this area so as to have the luminance value equivalent to the white pixel (the maximum luminance value) inside the white area according to the present exemplary embodiment.

In a case where the halftone image is pale, and the show-through image is thick, the show-through contour area 314, the halftone target area 316, and the overlapped target area 315 have similar variance values in some cases. For this reason, for example, the halftone target area 316 and the overlapped target area 315 are also significantly corrected together in the processing of "significantly exerting the correction in a case where the variance value is lower than a certain threshold" in the show-through contour area 314, and a desired result is not obtained. Therefore, it is effective to determine the paper white area on the basis of the difference between the pixel values and control the correction amount as in the present exemplary embodiment.

Flow Chart of the Show-Through Correction Processing

Figure 13:
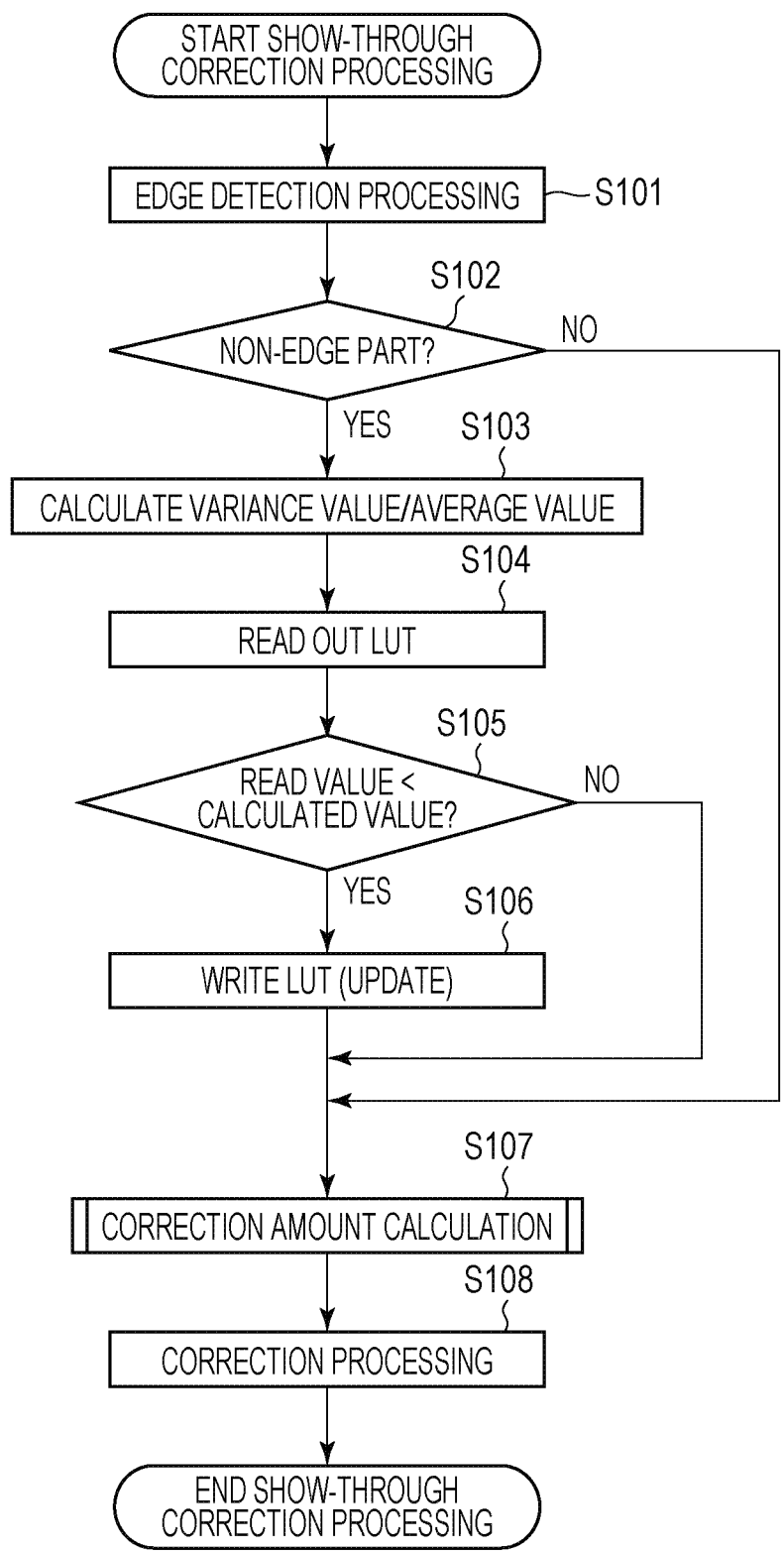
FIG. 13 is a flow chart illustrating an example of show-through correction processing.

FIG. 13 is a flow chart illustrating a flow of the show-through correction processing of the copier according to the first exemplary embodiment. The present flow chart is executed while the CPU 2100 controls the scanner unit 140 to execute the image scanning of the document 100 and controls the scanner image processing unit 2400 (in particular, the show-through correction processing unit 2430) in accordance with the program stored in the HDD 2130.

First, in S101, edge detection processing is executed on the scanned image. This processing is executed by the edge determination unit 2434, and edge detection is performed by referring to a window (output by buffer unit 2433) in which the target pixel of the scanned image is set as a center by using a related-art technology.

In S102, the CPU 2100 refers to the edge determination result in S101 and determines whether or not the target pixel is an edge part. In a case where it is determined that the target pixel is the edge part, the flow proceeds to S107. When the target pixel is not the edge part, the flow proceeds to S103.

In S103, calculation processings for the variance value and the average value are executed. These processings are executed by the variance value calculation unit 2432 and the average value calculation unit 2433, and the calculations are performed by referring to the window (output by the buffer unit 2433) in which the target pixel of the scanned image is set as the center.

In S104, the data is read out from the LUT of the variance-average storage unit 2437. This processing is executed by the variance-average storage control unit 2436, and the address of the LUT to be read is the same as the variance value calculated in S103. The read data becomes the show-through correction information.

In S105, the CPU 2100 executes the comparison to determine whether the value read in S104 or the average value calculated in S103 is higher. When the value read in S104 is higher, the flow proceeds to S107. When the average value calculated in S103 is higher, the flow proceeds to S106.

In S106, the data is written into the LUT of the variance-average storage unit 2437. The data to be written is the average value calculated in S103, and the address at which the data is written is the variance value calculated in S103.

Next, in S107, the correction amount for the show-through is calculated. This processing is mainly executed by the paper white determination unit 2435 and the correction amount calculation unit 2438, and details will be described below.

In S108, the show-through correction processing is executed on the input pixel (target pixel in S101). This processing is executed by the correction processing unit 2439, and the correction amount is added to the input signal value of the pixel (luminance value) on the basis of the correction amount calculated in S107 to increase the brightness of the pixel signal Dg, for example. In addition, the gain in accordance with the correction amount may be applied to the input signal value of the pixel. For example, in a case where the luminance value of the target pixel is lower than a predetermined luminance, the gain is set to be lower than 1 to suppress the correction. The correction may also be suppressed by decreasing the gain as the luminance value of the target pixel is lower. In addition, the gain may be decided on the basis of the average luminance value of the target area including the target pixel.

The flow chart of the show-through correction processing is ended as described above.

Flow Chart of the Correction Amount Calculation Processing

Figure 14:
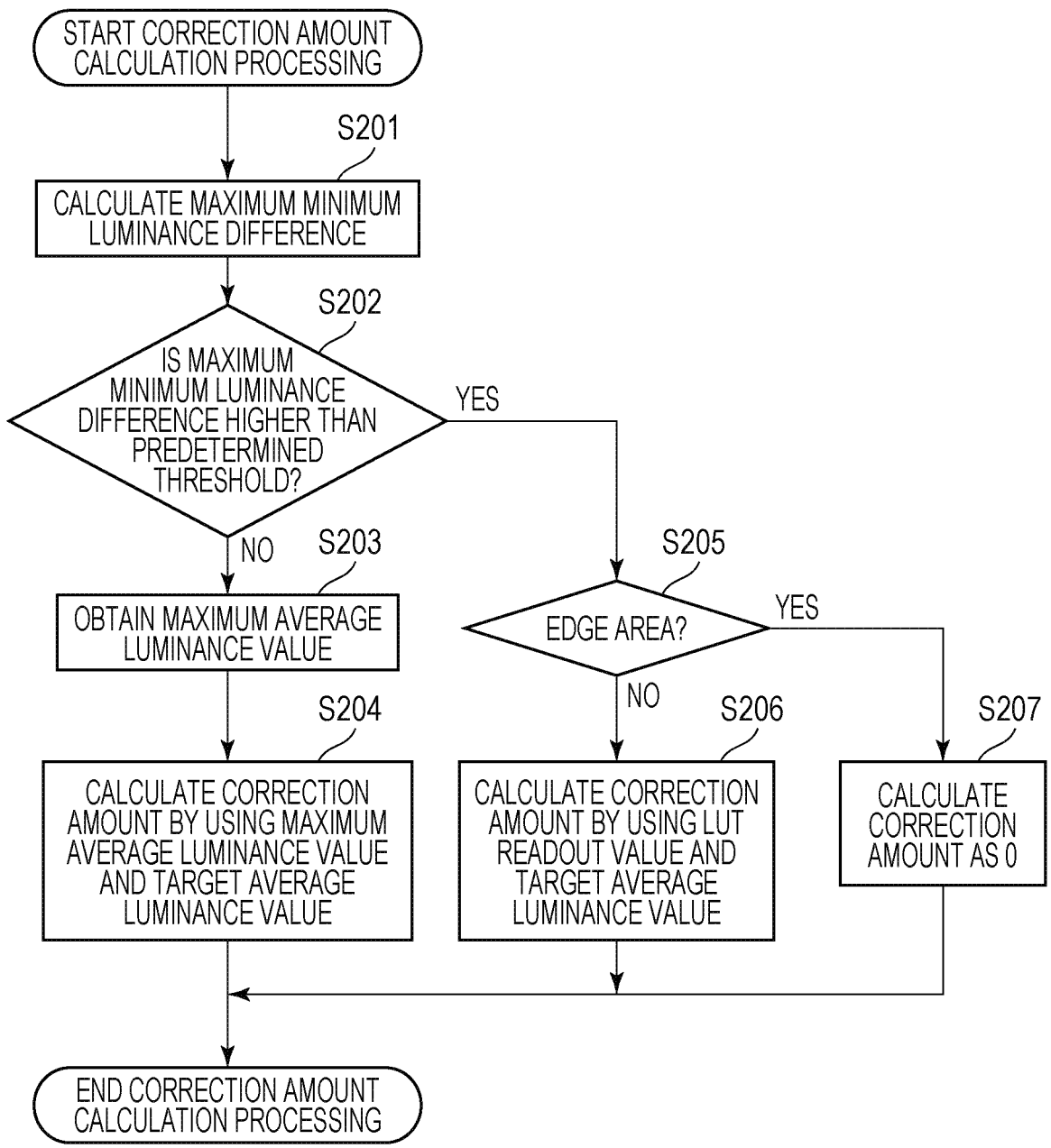
FIG. 14 is a flow chart illustrating an example of correction amount calculation processing according to the first exemplary embodiment.

FIG. 14 is a flow chart illustrating a flow of the show-through correction amount calculation processing according to the present exemplary embodiment. The present flow chart is executed in accordance with the program stored in the HDD 2130 while the CPU 2100 controls the show-through correction processing unit 2430 (in particular, the paper white determination unit 2435 and the correction amount calculation unit 2438).

First, in S201, the CPU 2100 controls the paper white determination unit 2435 to calculate the maximum minimum luminance difference. The maximum minimum luminance difference is calculated by the maximum value calculation unit 2451, the minimum value calculation unit 2452, and the subtractor 2453 of FIG. 6.

Next, in S202, the CPU 2100 controls the comparison unit 2454 to determine whether or not the maximum minimum luminance difference calculated in S201 is higher than a predetermined threshold. This threshold denoted by Th is previously set by the CPU 2100. Specifically, a value is set as the threshold which is lower than the maximum minimum luminance difference in the halftone target area 316 and the overlapped target area 315 in FIG. 12 and also higher than the maximum minimum luminance difference in the show-through contour area 314. As a result of the comparison, when it is determined that the maximum minimum luminance difference is higher than the predetermined threshold Th, the flow proceeds to S205. When it is determined that the maximum minimum luminance difference is lower than or equal to the predetermined threshold Th, the flow proceeds to S203. It should be noted that a comparison result with the predetermined threshold is generated as the paper white determination result Wf by the paper white determination unit 2435 in actuality and used by the correction amount calculation unit 2438.

In S203, a maximum average luminance value is obtained. This is a value output from the maximum luminance value holding unit 2461 of FIG. 7.

Next, in S204, the subtractor 2462 calculates a difference between the maximum average luminance value obtained in S203 and the average luminance value in the target area to be set as the correction amount. As a result, it is possible to calculate the correction amount with which the correction into the paper white (maximum average luminance value) can be performed in the contour part of the show-through or the like which has the variance value although the maximum minimum luminance difference is small.

In S205, it is determined whether or not the target area is the edge area. This determination is performed while the CPU 2100 controls the edge determination unit 2434. In a case where it is determined that the target area is not the edge area, the flow proceeds to S206. In a case where it is determined that the target area is the edge area, the flow proceeds to S207.

In S206, the correction amount is calculated by using a LUT readout value (pixel signal Dlut) and a target average luminance value (pixel signal Dave). The correction amount is calculated by the subtractor 2463 of the correction amount calculation unit 2438.

On the other hand, in S207, since the target area is the edge area, the correction amount is calculated as 0.

The present flow chart is ended as described above.

It should be noted that the difference between the maximum luminance value and the minimum luminance value is decreased in the low luminance area where all the pixels included in the target area have the low luminance. In this case, in S108, when the gain in accordance with the luminance value of the target pixel is used, the show-through correction is suppressed. However, before the flow chart of FIG. 14 is started, it is determined whether or not the luminance value of the target pixel is higher than or equal to the predetermined luminance value. Then, in a case where the luminance value of the target pixel is lower than the predetermined luminance value, a configuration may be adopted in which the show-through correction is not performed with respect to the target pixel without the execution of the flow chart of FIG. 14.

According to the above-described present exemplary embodiment, even in a case where the variance value is generated in the contour part of the show-through or the like, it is possible to appropriately calculate the correction amount by distinguishing the show-through area from the halftone dot image on the front side. Therefore, it is possible to appropriately correct the show-through area while the degradation of the image quality on the front side is suppressed.

Therefore, it is also possible to appropriately perform the show-through removal with respect to the contour part of the show-through area.

Second Exemplary Embodiment

According to the first exemplary embodiment, the method and configuration for calculating the correction amount have been described in which the maximum minimum luminance difference in the contour part of the show-through is paid attention to distinguish the halftone dot image on the front side from the contour part of the show-through.

However, if the area having the small maximum minimum luminance difference exists in the image on the front side, there is a possibility that the area is erroneously determined as the paper white area, and an incorrect correction amount is calculated. For example, this phenomenon is caused by the quality of the image sensor that scans the image in the scanner, the fluctuation or unevenness of the light emission of the illumination lamp, the feature of the document, or the like. Alternatively, this phenomenon occurs in a case where parts where the halftone dots in the image on the front side are not precisely printed are scattered about due to the printing quality of the printer that has printed the document to be scanned, or the like.

According to the second exemplary embodiment, a method and configuration for appropriately calculating the correction amount even in a case the image having the small maximum minimum luminance difference exists on the front side will be described.

According to the present exemplary embodiment, an internal configuration of the correction amount calculation unit 2438 for the show-through and a processing flow with regard to the correction amount calculation processing are different with respect to the first exemplary embodiment. The external appearance and the scanner unit 140 of the copier, the configuration of the scanner image processing unit 2400, and the configuration of the controller 200 are similar to those according to the first exemplary embodiment. Hereinafter, a difference between the present exemplary embodiment and the first exemplary embodiment will be described in detail.

Show-Through Correction Processing Unit

Figure 15:
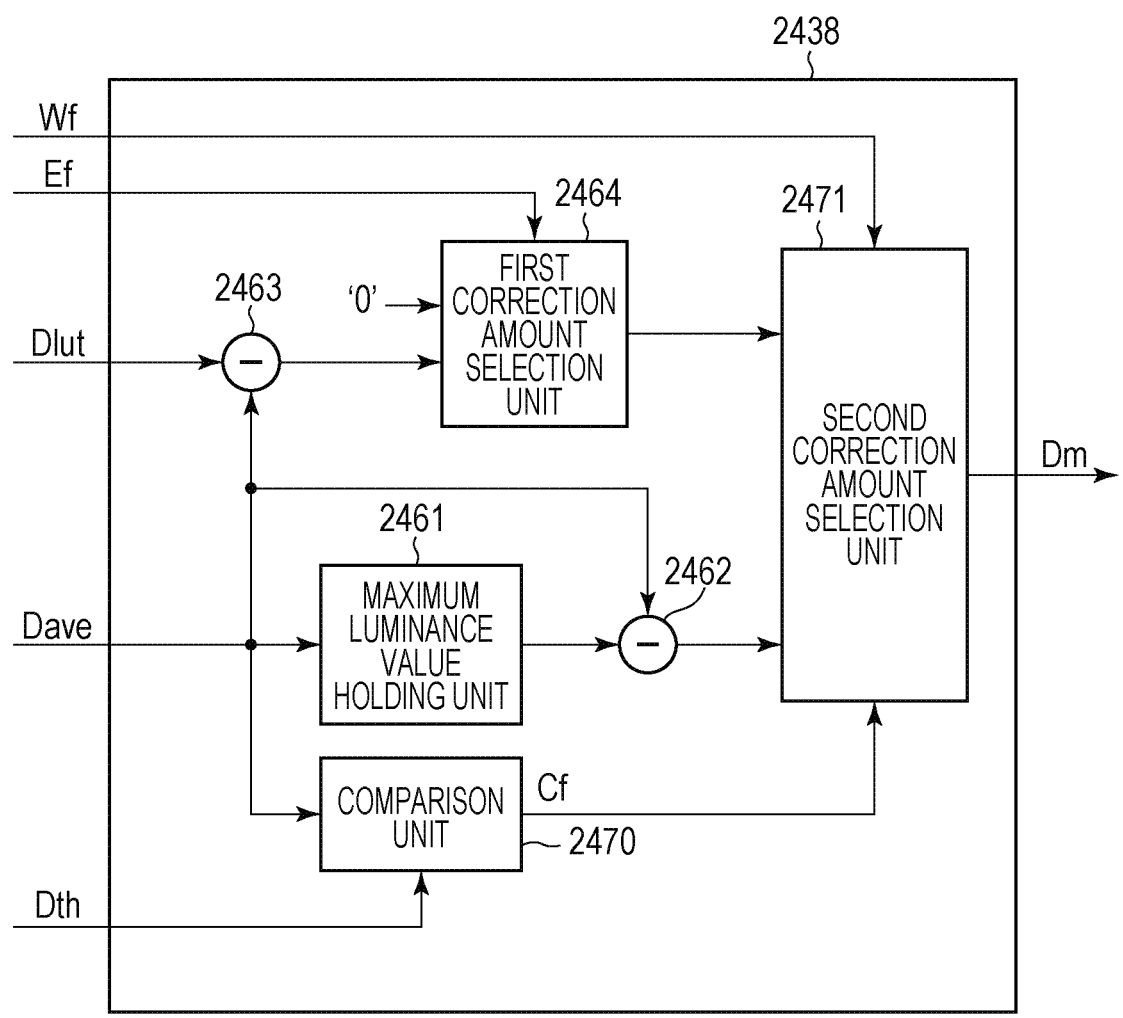
FIG. 15 provides an example of the configuration of a correction amount calculation unit according to a second exemplary embodiment.

FIG. 15 is a block diagram illustrating a configuration of the correction amount calculation unit 2438 according to the second exemplary embodiment.

The maximum luminance value holding unit 2461, the subtractor 2462, the subtractor 2463, and the first correction amount selection unit 2464 are similar to those according to the first exemplary embodiment.

A comparison unit 2470 compares the pixel signal Dave set as the average value calculated by the average value calculation unit 2433 in the current target area with a predetermined threshold Dth. When the value of the pixel signal Dave is higher than the threshold Dth, the comparison unit 2470 sets a comparison result Cf as 1 to be output to a second correction amount selection unit 2471 in a subsequent stage. On the other hand, when the value of the pixel signal Dave is lower than or equal to the threshold Dth, the comparison unit 2470 sets the comparison result Cf as 0 to be output to the second correction amount selection unit 2471 in the subsequent stage.

The second correction amount selection unit 2471 is different from the second correction amount selection unit 2465 according to the first exemplary embodiment and refers to not only the paper white determination result Wf but also the comparison result Cf. The second correction amount selection unit then selects whether to output the signal value output by the first correction amount selection unit 2464 as the correction amount Dm or output the difference between the signal values calculated by the subtractor 2462 as the correction amount Dm.

In a case where the paper white determination result Wf is 1, and furthermore, the comparison result Cf is 1, the second correction amount selection unit 2465 outputs the difference between the pixel signal currently input and the maximum luminance value which is calculated by the subtractor 2462 as the correction amount. This means that, in a case where the target area is the paper white area and furthermore the average luminance value of the target area is more luminance than the threshold Dth, the difference between the maximum luminance value and the current input pixel signal is set as the correction amount. In this manner, the condition that the average luminance value is more luminance than the threshold Dth is also taken into account, and even when the part where the halftone dots of the image on the front side are not precisely printed (part having the low variance value on the image on the front side) exists, it is possible to calculate the correction amount by distinguishing the area. This is because the average luminance value is decreased on the front image in no small part. Therefore, the threshold Dth is preferably set as a value slightly lower than the luminance of the show-through image. This is because, when the slightly lower value is set, it is possible to avoid an erroneous correction even in a case where the part having the low variance value is generated in an area thicker than the show-through on the front side. In a case where the paper white determination result Wf is 0 or the comparison result Cf is 0, the second correction amount selection unit 2465 outputs the value input from the first correction amount selection unit 2464 as the correction amount. This means that the value input from the first correction amount selection unit 2464 is set as the correction amount in a case where the target area is not the paper white area and the average luminance value of the target area is darker than the threshold Dth.

Flow Chart of the Show-Through Correction Processing

Figure 16:
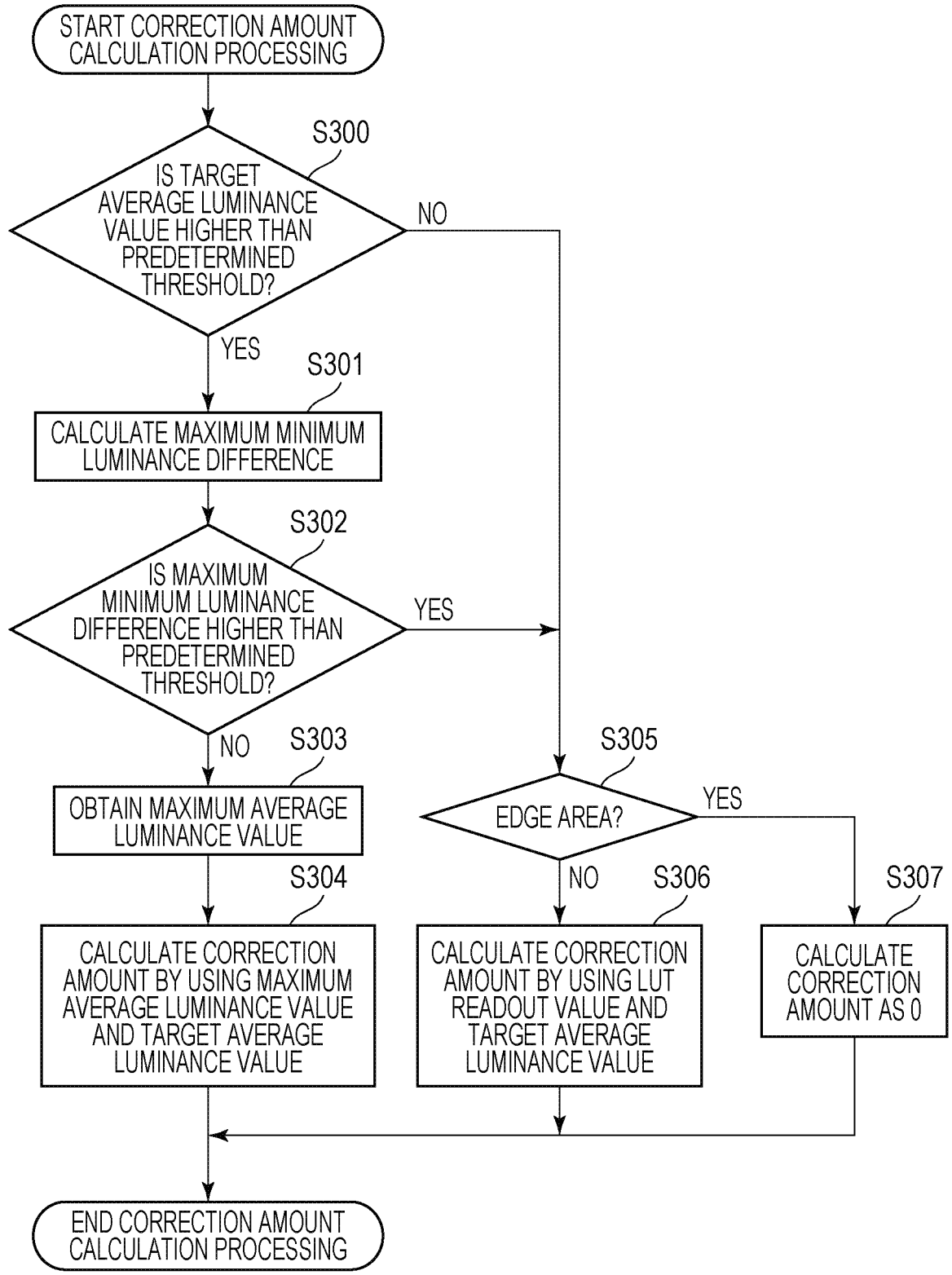
FIG. 16 is a flow chart illustrating an example of the correction amount calculation processing according to the second exemplary embodiment.

FIG. 16 is a flow chart illustrating a flow of the correction amount calculation processing according to the second exemplary embodiment. The present flow chart is executed while the CPU 2100 controls the show-through correction processing unit 2430 (in particular, the paper white determination unit 2435 and the correction amount calculation unit 2438) in accordance with the program stored in the HDD 2130.

First, in S300, it is determined whether or not the average luminance value of the target area including the target pixel is higher than the predetermined threshold Dth. This determination is performed while the CPU 2100 controls the comparison unit 2470 inside the correction amount calculation unit 2438. The predetermined threshold Th is previously set by the CPU 2100. Specifically, the value slightly lower than the luminance of the show-through pixel is set as the threshold as described above. In a case where the average luminance value is higher than the predetermined threshold Dth, the flow proceeds to S301. It should be noted that, in S301, the luminance value of the target pixel may be compared with the predetermined value instead of the average luminance value of the target area, and the flow may proceed to S301 when the luminance value of the target pixel is higher than or equal to the predetermined value. When the flow proceeds to S301, it is possible to set the difference between the maximum average luminance value and the target average luminance value as the correction amount while the area up to the luminance of the show-through pixel which is determined in S302 as the paper white area is set as the target. In a case where the target average luminance value is lower than or equal to the predetermined threshold Dth, the flow proceeds to S305. When the flow is branched in S300 as described above, it is possible to avoid the erroneous correction even in a case where the part having the low variance value is generated in the area thinker than the show-through on the front side.

S301 to S307 are similar to S201 to S207 in the flow chart illustrated in FIG. 14 according to the first exemplary embodiment.

The flow chart of the show-through correction preprocessing is ended as described above.

With the configuration and processing according to the above-described present exemplary embodiment, even in a case where the image on the front side in which the maximum minimum luminance difference is partially small is generated, it becomes possible to appropriately calculate the correction amount. As a result, according to the present exemplary embodiment, even in a case where the maximum minimum luminance difference of the image area on the front side is deceased in the part where the halftone dots of the image on the front side are not precisely printed or the like, it is possible to suppress the erroneous correction by the show-through correction unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-035932, filed Feb. 28, 2017, which is hereby incorporated by reference herein in its entirety.

What is claimed is:

1. An image processing apparatus comprising:
one or more processors or one or more circuits that cause the image processing apparatus to function as:
an obtaining unit configured to obtain image data by scanning of a document, to set a target area of the image data and to obtain brightness values at two pixels among a plurality of pixels included in the set target area, wherein the two pixels are a pixel having a maximum brightness among the plurality of pixels included in the set target area and a pixel having a minimum brightness among the plurality of pixels included in the set target area, and the target area has a predetermined size and includes a target pixel;
a determination unit configured to determine whether or not a difference between the brightness values of the two pixels is higher than a predetermined threshold;
a decision unit configured to decide a brightness correction amount for increasing brightness of the target pixel based on the result of the determination by the determination unit; and
a correction unit configured to correct a brightness value of the target pixel based on the brightness correction amount decided by the decision unit,
wherein, in a case where a brightness value corresponding to the brightness of the target pixel is higher than or equal to a predetermined brightness value and the difference between the brightness values of the two pixels is lower than or equal to the threshold, the decision unit is configured to decide the brightness correction amount so that the brightness correction amount is higher than a brightness correction amount decided when the difference between the brightness values of the two pixels is higher than the threshold.

2. The image processing apparatus according to claim 1, wherein one or more processors or one or more circuits cause the image processing apparatus to further function as a calculation unit configured to calculate a degree of variation in brightness values of the plurality of pixels included in the target area.

3. The image processing apparatus according to claim 1, wherein, in a case where the brightness value corresponding to the brightness of the target pixel is higher than or equal to the predetermined brightness value and the difference between the brightness values of the two pixels is lower than or equal to the threshold, the decision unit is configured to decide the brightness correction amount so that the brightness of the target pixel is set as a predetermined brightness.

4. The image processing apparatus according to claim 3, wherein the predetermined brightness is the brightness of the pixel which has a maximum brightness value in the image data.

5. An image processing method comprising:
setting a target area of image data of a scanned document, wherein the target area has a predetermined size and includes an arbitrarily set target pixel;
obtaining brightness values at two pixels among a plurality of pixels included in the set target area, wherein the two pixels are a pixel having a maximum brightness among the plurality of pixels included in the set target area and a pixel having a minimum brightness among the plurality of pixels included in the set target area;
determining whether or not the difference between the brightness values of the two pixels is higher than a predetermined threshold;
deciding a brightness correction amount for increasing brightness of the target pixel based on the result of the determination in the determining step; and
correcting a brightness value of the target pixel based on the decided brightness correction amount,
wherein, in a case where a brightness value corresponding to the brightness of the target pixel is higher than or equal to a predetermined brightness value and the difference between the characteristic amounts of the two pixels is lower than or equal to the brightness values, the brightness correction amount is decided so that the brightness correction amount is higher than a correction amount output when the difference between the brightness values of the two pixels is higher than the threshold.

6. A non-transitory computer-readable recording medium storing at least one program, which when executed, performs an image processing method, the image processing method comprising:
setting a target area of image data of a scanned document, wherein the target area has a predetermined size and includes an arbitrarily set target pixel;
obtaining brightness values at two pixels among a plurality of pixels included in the set target area, wherein the two pixels are a pixel having a maximum brightness among the plurality of pixels included in the set target area and a pixel having a minimum brightness among the plurality of pixels included in the set target area;
determining whether or not the difference between the brightness values of the two pixels is higher than a predetermined threshold;
deciding a brightness correction amount for increasing brightness of the target pixel based on the result of the determination in the determining step; and
correcting a brightness value of the target pixel based on the decided brightness correction amount,
wherein, in a case where a brightness value corresponding to the brightness of the target pixel is higher than or equal to a predetermined brightness value and the difference between the brightness values is lower than or equal to the threshold, the brightness correction amount is decided so that the brightness correction amount is higher than a correction amount output when the difference between the brightness values of the two pixels is higher than the threshold.

7. An image processing apparatus comprising:
one or more processors or one or more circuits that cause the image processing apparatus to function as:
an obtaining unit configured to obtain image data by scanning of a document, and to set a target area of the image data, wherein the target area has a plurality of pixels and includes a target pixel;
a decision unit configured to decide a brightness correction amount for increasing brightness of the target pixel based on at least contrast within the plurality of pixels included in the set target area and a degree of variation in brightness values of the plurality of pixels included in the set target area; and
a correction unit configured to correct a brightness value of the target pixel based on the brightness correction amount decided by the decision unit.

8. The image processing apparatus according to claim 7, wherein the decision unit decides the brightness correction amount for increasing brightness of the target pixel based on the contrast within the plurality of pixels included in the set target area, the degree of variation in brightness values of the plurality of pixels included in the set target area, and a decree of variation in brightness values of a plurality of pixels included in another area of the image data.

9. The image processing apparatus according to claim 7, wherein one or more processors or one or more circuits cause the image processing apparatus to further function as a calculation unit configured to calculate an average brightness value for each of degrees of variation in brightness values of areas included in the image data, and wherein the decision unit decides the brightness correction amount for increasing brightness of the target pixel based on the contrast within the plurality of pixels included in the set target area, the degree of variation in brightness values of the plurality of pixels included in the set target area, and the average brightness value for each of degrees of variation in brightness values of the areas included in the image data.

10. The image processing apparatus according to claim 7, wherein the contrast is a difference between a first brightness value of a pixel having a maximum brightness among the plurality of pixels included in the set target area and a second brightness value of a pixel having a minimum brightness among the plurality of pixels included in the set target area.

11. The image processing apparatus according to claim 7, further comprising a scanner configured to scan the document,
wherein the obtaining unit obtains the image data by scanning of the document by the scanner, and to set the target area of the image data.

12. An image processing method comprising:
obtaining image data by scanning of a document;
setting a target area of the image data, wherein the target area has a plurality of pixels and includes a target pixel;
deciding a brightness correction amount for increasing brightness of the target pixel based on at least contrast within the plurality of pixels included in the set target area and a degree of variation in brightness values of the plurality of pixels included in the set target area; and
correcting a brightness value of the target pixel based on the decided brightness correction.

* * * * *